(12) United States Patent
Horie

(10) Patent No.: US 9,680,321 B2
(45) Date of Patent: Jun. 13, 2017

(54) FEEDING APPARATUS AND FEEDING METHOD

(71) Applicant: Kabushiki Kaisha Toshiba, Tokyo (JP)

(72) Inventor: Yutaka Horie, Mitaka (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 483 days.

(21) Appl. No.: 14/464,993

(22) Filed: Aug. 21, 2014

(65) Prior Publication Data

US 2015/0130278 A1    May 14, 2015

Related U.S. Application Data

(60) Provisional application No. 61/903,875, filed on Nov. 13, 2013.

(51) Int. Cl.

| | |
|---|---|
| H01H 35/00 | (2006.01) |
| H02J 7/00 | (2006.01) |
| G06F 1/26 | (2006.01) |
| H02J 5/00 | (2016.01) |
| H02J 7/02 | (2016.01) |

(52) U.S. Cl.
CPC ............. *H02J 7/0068* (2013.01); *G06F 1/26* (2013.01); *H02J 5/005* (2013.01); *H02J 7/025* (2013.01); *Y10T 307/527* (2015.04)

(58) Field of Classification Search
USPC .................................................. 307/104, 116
See application file for complete search history.

(56) References Cited

U.S. PATENT DOCUMENTS

| | | | |
|---|---|---|---|
| 7,692,330 B2 | 4/2010 | Takada et al. | |
| 2012/0193993 A1* | 8/2012 | Azancot ................ | H02J 5/005 307/104 |

FOREIGN PATENT DOCUMENTS

| | | |
|---|---|---|
| JP | 2005-094862 | 4/2005 |
| JP | 2007-043888 | 2/2007 |

* cited by examiner

*Primary Examiner* — Danny Nguyen
(74) *Attorney, Agent, or Firm* — Rutan & Tucker, LLP

(57) ABSTRACT

A feeding apparatus configured to be supplied with electric-power from a noncontact power-feeding module and to feed electric-power to a power-feeding object, the feeding apparatus, includes: an electric-current variation detecting block configured to detect variation of power-feeding electric-current supplied from this noncontact power-feeding module; a battery configured to assist supply of electric-power from the noncontact power-feeding module; and a charger configured to perform setting for boosting, based on a request from the electric-current variation detecting block, wherein the battery assists supply of electric-power when the setting for boosting is performed.

6 Claims, 4 Drawing Sheets

FEEDING APPARATUS AND FEEDING METHOD

CROSS-REFERENCE TO RELATED APPLICATION(S)

This application claims priority from U.S. Provisional Patent Application No. 61/903,875 filed on Nov. 13, 2013, the entire contents of which are incorporated herein by reference.

FIELD

Embodiments of the present invention relate to a feeding apparatus and a feeding method.

BACKGROUND ART

There has been a background that various types (an electromagnetic induction type, an electric-field coupling type, and a resonance type) of noncontact power-feeding modules being inferior to conventional alternating-current (AC) adapters in load response characteristic have been brought into a market. Regarding a technical background, because there is hope that a certain object is achieved, a system design made in consideration of a power supply having a poor load response is needed.

Hitherto, there has been a problem that, in the case of driving a system by a noncontact power-feeding module, even when system power would be within a rated electric-power of the noncontact power-feeding module, if the load variation is large, the supply of electric-power to the system is unstable. That is, there is a demand for more stable supply of electric-power in the case of using the noncontact power-feeding module in the supply of electric-power. However, no means for fulfilling the demand is known.

DETAILED DESCRIPTION

Hereinafter, an embodiment of the invention is described with reference to FIGS. 1 to 4.

Figure 1:
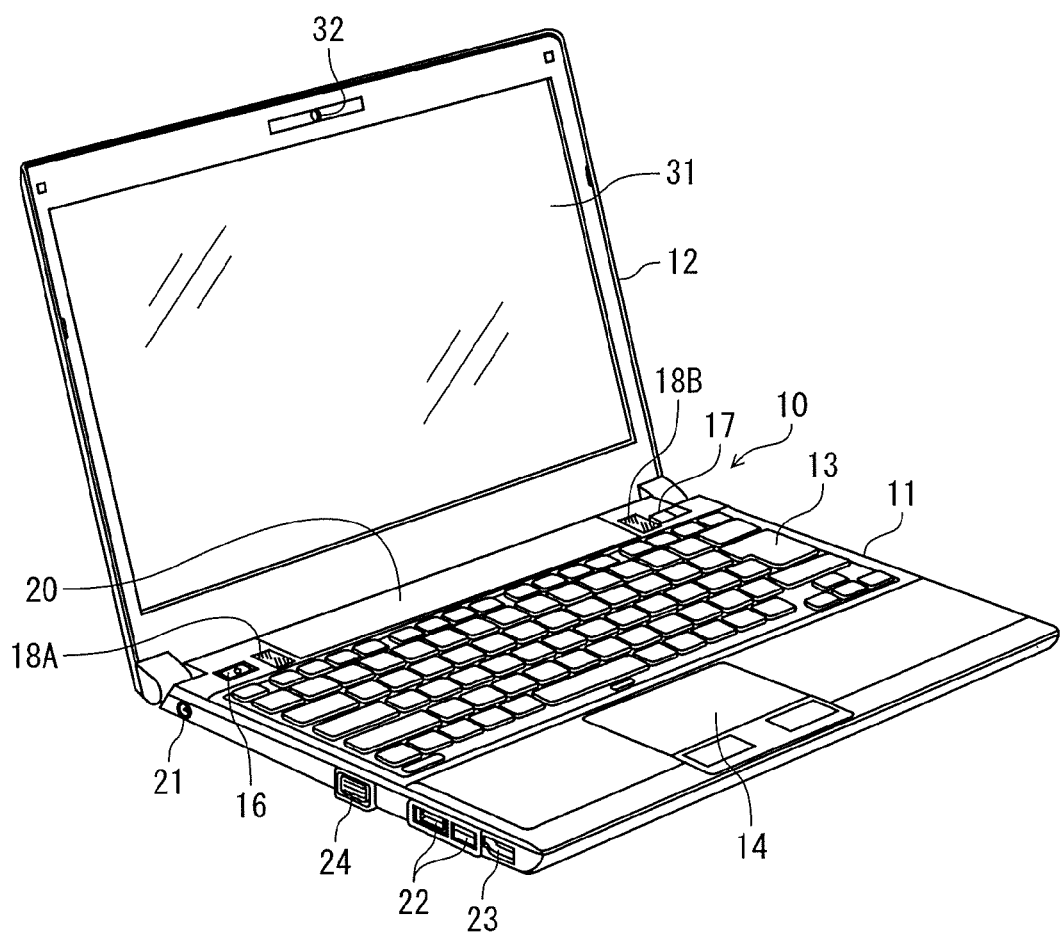
FIG. 1 is a perspective diagram illustrating an example of the external-appearance of an electronic apparatus according to an embodiment of the invention.
Figure 2:
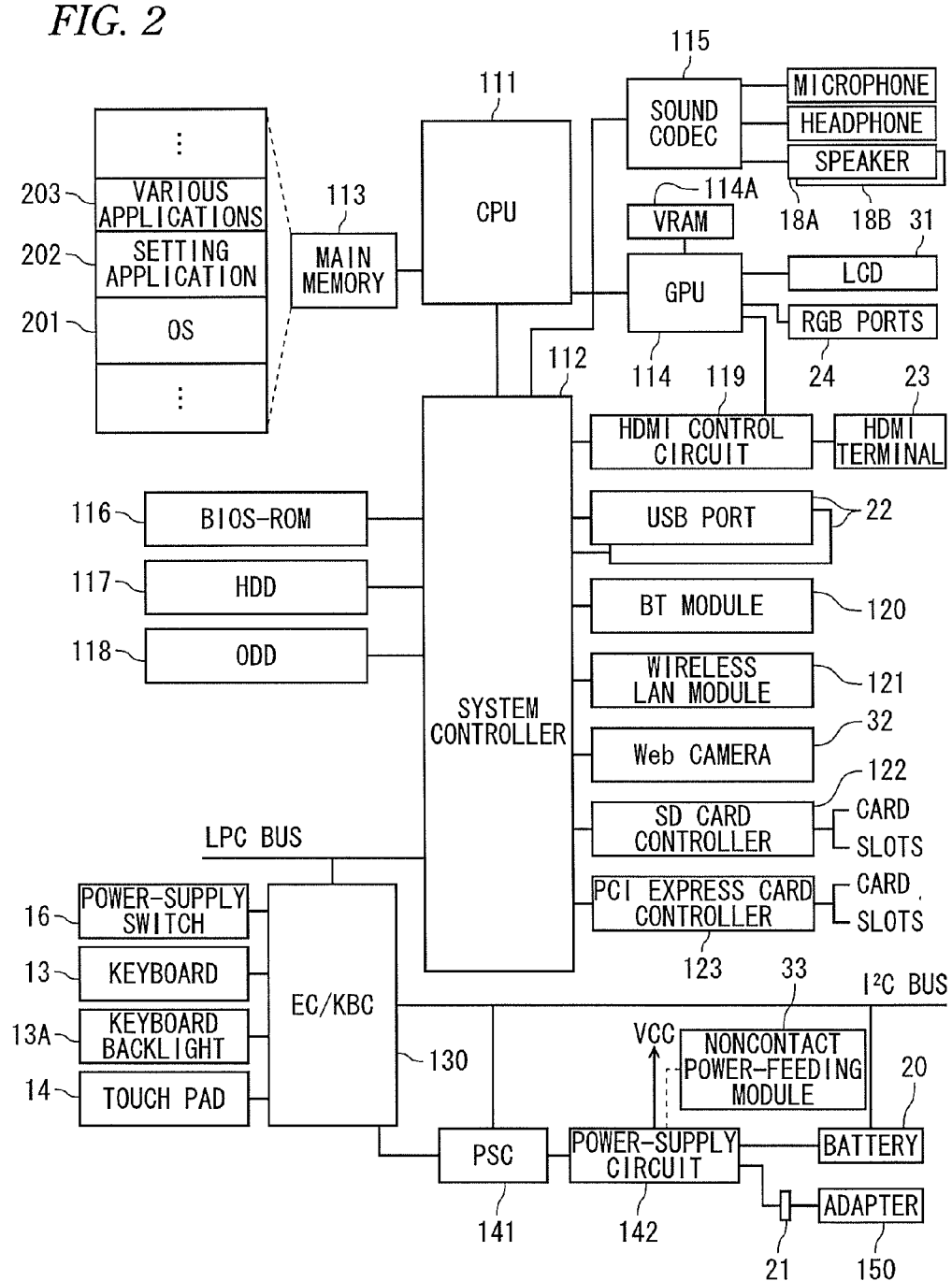
FIG. 2 is a block diagram illustrating an example of the system configuration of an electronic apparatus according to an embodiment of the invention.
Figure 3:
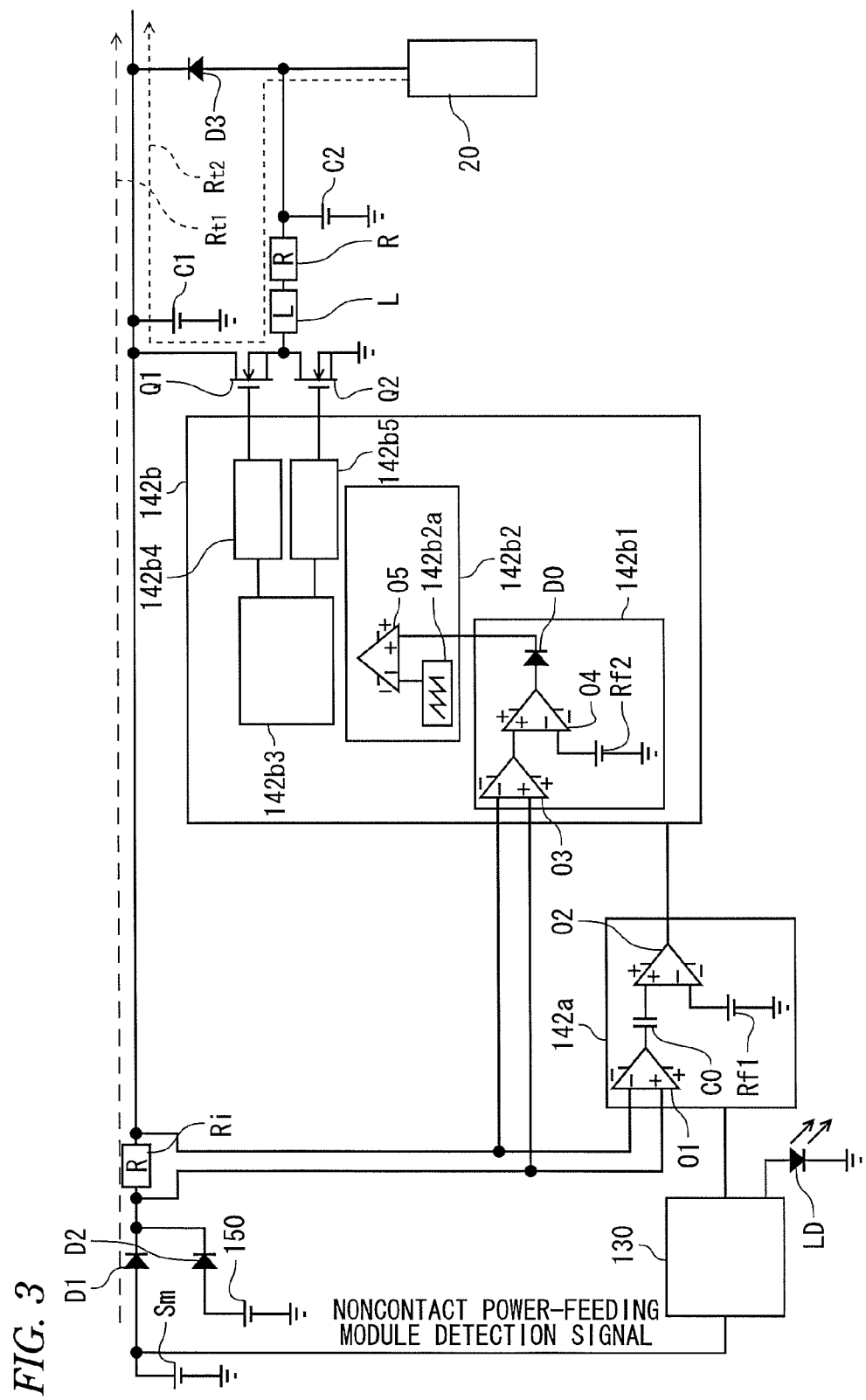
FIG. 3 is a functional block configuration diagram for illustrating a primary part of the embodiment.

Referring first to FIGS. 1 to 3, the configuration of an electronic apparatus according to an embodiment is described. This electronic apparatus can be implemented as, e.g., a portable notebook personal computer, a tablet terminal, and other various types of information processing apparatuses.

FIG. 1 is a perspective diagram taken from a front side of a notebook computer 10 in a state of opening a display unit thereof. This computer 10 is configured to receive electric-power from a battery 20. This computer 10 includes a computer main-unit 11 and a display unit 12. A display device such as a liquid crystal display unit (LCD) 31 is incorporated into the display unit 12. Moreover, a camera (Web camera) 32 is arranged on a top end portion of the display unit 12.

The display unit 12 is mounted on the computer main-unit 11 turnably between an open position in which the top surface of the computer main-unit 11 is exposed, and a closed position in which the top surface of the computer main-unit 11 is covered by the display unit 12. The computer main-unit 11 has a thin box-shaped casing on the top surface of which a keyboard 13, a touch pad 14, a power-supply switch 16 for power-on/off of this computer 10, several function buttons 17, and speakers 18A and 18B are arranged.

A power-supply connector 21 is also provided on the computer main-unit 11. The power-supply connector 21 is provided on a side surface, e.g., a left-side surface of the computer main-unit 11. An external power-supply is detachably connected to the power-supply connector 21. An alternating-current (AC) adapter can be used as an external power-supply. The AC adapter is a power supply that converts commercial electric-power (AC electric-power) to direct-current (DC) electric-power.

The battery 20 is detachably attached to, e.g., a rear-end portion of the computer main-unit 11. The battery 20 may be a battery built-into this computer 10.

This computer 10 is driven by electric-power from an external power-supply or the battery 20. If an external power-supply is connected to the power-supply connector 21 of this computer 10, this computer 10 is driven by electric-power from the external power-supply. Electric-power from the external power-supply is also used to charge the battery 20. While the external-power supply is not connected to the power-supply connector 21 of this computer 10, this computer 10 is driven by electric-power from the battery 20.

Moreover, several universal serial bus (USB) ports 22, high-definition multimedia interfaces (HDMI) output terminals 23, and a red-green-and-blue (RGB) port 24 are provided in the computer main-unit 11.

FIG. 2 illustrates the system configuration (i.e., the configuration of power-feeding targets) of this computer 10. This computer 10 includes a central processing unit (CPU) 111, a system controller 112, a main memory 113, a graphic processing unit (GPU) 114, a sound codec 115, basic-input-output-system read-only memory (BIOS-ROM) 116, a hard disk drive (HDD) 117, an optical disk drive (ODD) 118, a Bluetooth (BT) module (Bluetooth is a registered trademark) 120, a wireless local area network (LAN) module 121, a secure digital (SD) card controller 122, a peripheral component interconnect (PCI) EXPRESS card controller 123, an embedded-controller/keyboard-controller integrated circuit (EC/KBC IC) 130, a keyboard backlight 13A, a power-supply controller (PSC) 141, a power-supply circuit 142, and so on.

The CPU 111 is a processor that controls each component of this computer 10. The CPU 111 executes various software-programs loaded into the main memory 113 from the HDD 117. The software-programs include an operating system (OS) 201, a setting application program 202 whose description is omitted, and various application programs 203. The various applications 203 include the above desktop and full-screen applications.

The CPU 111 executes a basic input/output system (BIOS) stored in BIOS-ROM 116 which is a non-volatile memory. The BIOS is a system program for controlling hardware.

The GPU 114 is a display controller that controls a liquid crystal display (LCD) 31 used as a display monitor of this computer 10. The GPU 114 generates, from display data stored in a video memory (video random access memory (VRAM)) 114A, a display signal (low voltage differential signaling (LVDS) signal) to be supplied to the LCD 31. Moreover, the GPU 114 can also generate, from display data, analog RGB signals and HDMI video signals. Analog RGB signals are supplied to an external display via the RGB ports 24. The HDMI output terminal 23 can send an HDMI video signal (i.e., a digital uncompressed video signal) and a digital audio signal with one cable. An HDMI control circuit 119 is an interface for sending an HDMI video signal and a digital audio signal via the HDMI output terminal 23 to an external display.

The system controller 112 is a bridge device that connects the CPU 111 to each component. The system controller 112 incorporates a serial advanced technology attachment (ATA) controller for controlling the hard disk drive (HDD) 117 and the optical disk drive (ODD) 118. Moreover, the system controller 112 performs communication with each component on a low PIN count (LPC) bus.

The EC/KBC 130 is connected to the LPC bus. The EC/KBC 130, and the power-supply controller (PSC) 141 and the battery 20 are interconnected to one another via a serial bus such as an inter-integrated circuit (I2C) bus.

The EC/KBC 130 is a power management controller for performing the power management of this computer 10 and implemented as a one-chip microcomputer having an embedded keyboard controller that controls, e.g., the keyboard (KB) 13 and the touch pad 14. The EC/KBC 130 has the function of performing the power-on/off of this computer 10 in response to operations of the power-supply switch 16, which are performed by users. The control of the power-on/off of this computer 10 is performed by the cooperation of the EC/KBC 130 and the power-supply controller (PSC) 141. When receiving an ON-signal transmitted from the EC/KBC 130, the power-supply controller (PSC) 141 controls the power-supply circuit 142 to perform the power-on of this computer 10. When receiving an OFF-signal transmitted from the EC/KBC 130, the power-supply controller (PSC) 141 controls the power-supply circuit 142 to perform the power-off of this computer 10. The EC/KBC 130, the power-supply controller (PSC) 141 and the power-supply circuit 142 work by electric-power supplied from the battery 20 or an AC adapter 150, even during the power-off of this computer 10.

Moreover, the EC/KBC 130 can turn on/off the keyboard backlight 13A arranged on the rear surface of the keyboard 13. Furthermore, the EC/KBC 130 is connected to a panel opening/closing switch 131 configured to detect the opening/closing of the display unit 12. Even when the opening of the display unit 12 is detected by the panel opening/closing switch 131, the EC/KBC 130 can perform the power-on of this computer 10.

The power-supply circuit 142 generates electric-power (operating-power) to be supplied to each component, using electric-power supplied from the battery 20 or from the AC adapter 150 connected as an external power-supply to the computer main-unit 11. The power-supply circuit 142 also receives electric-power from a noncontact power-feeding module 33 by, e.g., an electromagnetic induction method, and obtains DC-voltage, using a circuit (not shown). This circuit includes, e.g., a pickup coil wound on a pickup core arranged close to a power-feeding line, in which a high-frequency electric-current flows when a constant electric-current is supplied to the power-feeding line connected to the noncontact power-feeding module 33 that is a high-frequency power-supply configured to output a constant alternating electric-current. The circuit also includes a resonance capacitor parallel-connected to this pickup coil, a rectifying portion using a diode bridge parallel connected to this resonance capacitor, and a constant-voltage circuit configured to control electric-current output by this rectifying portion to a predetermined voltage.

FIG. 3 is a functional block configuration diagram for illustrating a primary part of the embodiment of the feeding apparatus, which focuses on the power-supply circuit 142. Reference numeral Sm denotes the above DC-voltage. A higher one of this DC-voltage Sm and a voltage output from the AC adapter 150 through the power-supply connector 21 is selected by diodes D1 and D2, and relates to power-feeding. The EC/KBC 130 receives the DC-voltage Sm as a detection signal that indicates the detection of the noncontact power-feeding module 33. Thus, the EC/KBC 130 turns on a DC-IN light-emitting diode (LED) LD, and sends out an operating-condition notification signal of the noncontact power-feeding module 33 to an electric-current variation detecting block 142a (through the power-supply controller (PSC) 141).

The electric-current variation detecting block 142a is a block that detects the variation of electric-current flowing in a resistor Ri. The voltage drop of the resistor Ri is amplified, e.g., several tens of times by an amplifier O1. The AC-component of the amplified voltage-drop is obtained by a capacitor C0 and compared with a reference voltage Rf1 by a comparator O2. If the AC-component is relatively large, the electric-current variation detecting block 142a sends a boost-on signal of several milli-seconds (ms) to a DC/DC converter 142b.

The DC/DC converter integrated circuit (IC) 142b includes an input-current limitation control portion 142b1, a pulse-width modulation (PWM) generation portion 142b2, a driver logic portion 142b2, a high-side field-effect transistor (FET) driver block 142b4, and a low-side FET driver block 142b5.

The input-current limitation control portion 142b1 amplifies the voltage drop of the resistor Ri to, e.g., several tens of times by an amplifier O3, and compares the amplified voltage-drop with a reference voltage Rf2 by a comparator O4. If the voltage drop is relatively large, a diode D0 is conducted. Thus, a control loop, whose input electric-current has a constant value, is effective.

The PWM generation portion 142b2 compares an output of a saw-tooth wave (triangular wave) transmitter 142b2a with an input from the input-current limitation control portion 142b1 by a comparator O4. Thus the PWM generation portion 142b2 obtains a PWM signal and sends the PWM signal to the driver logic portion 142b3.

The drier logic portion 142b3 is configured to control the high-side FET driver block 142b4 and the low-side FET driver block 142b5 in response to this PWM signal.

N-channel metal-oxide semiconductor (MOS) FETs Q1 and Q2 are conducted or non-conducted by controlling the high-side FET driver block 142b4 and the low-side FET driver block 124b5. Thus, each component is usually supplied with electric-power through a route indicated with dashed lines Rt1. However, during the duration of the above boost-on signal, each component is supplied with electric-power through a route indicated with dashed lines Rt2 in addition to the route indicated with dashed lines Rt1.

Incidentally, capacitors C1 and C2 are used for smoothing. A diode D3 is used for backflow prevention. A resistor R and an inductor L aim at electric-current stabilization.

Figure 4:
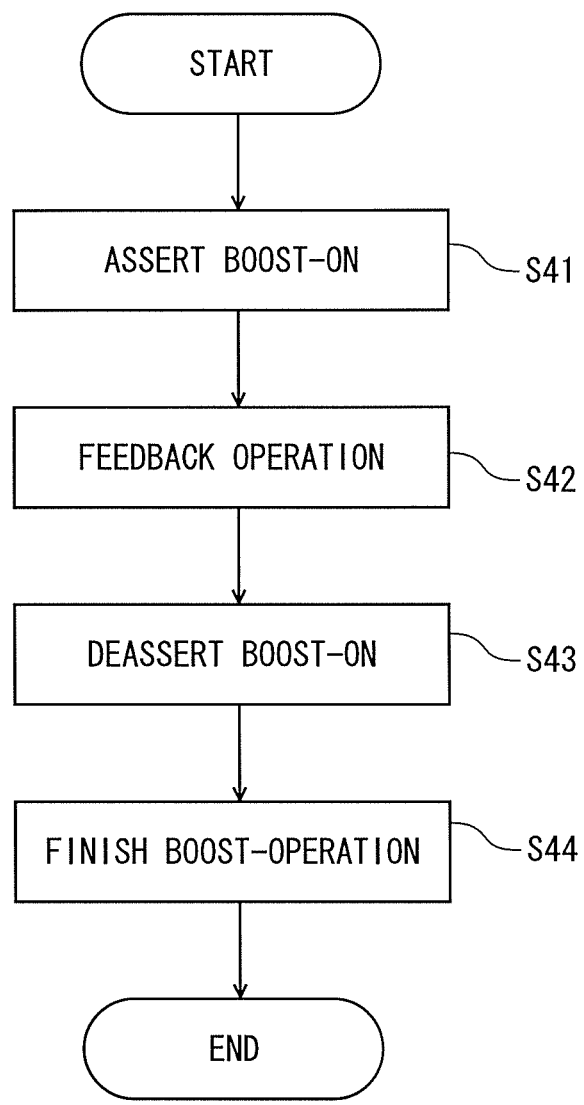
FIG. 4 is a flowchart illustrating an example of a processing method according to the embodiment.

FIG. 4 is a flowchart illustrating an example of a processing method according to the embodiment.

In step S41, the electric-current variation detecting block 142a monitors an output electric-current of the noncontact power-feeding module 33 while electric-power is supplied by noncontact power-feeding. If the electric-current variation exceeds a threshold (i.e., if the supply capability of the noncontact power-feeding module 33 is exceeded), a boost-on signal is asserted (enabled) against a charger (i.e., the DC/DC converter IC 142b).

In step S42, when the boost-on signal is asserted, the charger performs a boost operation using the battery 20 as a power supply. That is, the charger performs an operation of making an input electric-current constant, using a feedback loop.

In step S43, then, if the variation of an output electric-current from the noncontact power-feeding module 33 becomes less than a threshold, the electric-current variation detecting block 142a de-asserts (disabled) against the charger.

In step S44, the charger finishes a boost operation when the boost-on signal is de-asserted. Then, electric-power is supplied to the system only from the noncontact power-feeding module 33.

(Regarding DC-IN LED Control in Case of Supplying Electric-power to System by Non-contact Power-feeding)

Generally, the EC monitors the voltage of a power-supply line directly or indirectly through an IC, such as the charger, which incorporates a comparator. Then, according to the status of the monitored voltage, the DC-IN LED is turned on or off. Thus, if a power-supply voltage largely varies due to a system load variation, as in the case of performing noncontact power-feeding, the DC-IN LED accordingly repeats turning-on and turning-off. This brings a feeling of anxiety to a user.

Then, "providing a blank time (e.g., 100 ms) between the reduction of the power-supply voltage and the turning-off of the DC-IN LED (LD) in the case of supplying electric-power only by contact power-feeding" is added to the controlling of the DC-IN LED (LD) of the EC/KBC 130 according to the embodiment. Consequently, the above problem of anxiety feeling is resolved.

As described above, even when the system power is within a rated electric-power, if the electric-current variation of the noncontact power-feeding module exceeds a threshold (i.e., the electric-current variation is at a level that cannot be dealt with by the noncontact power-feeding module), the stable supply of electric-power to the system can be achieved utilizing electric-discharge caused by performing a boost operation using the battery as a power supply. Moreover, providing a blank time in the controlling of the DC-IN LED by the EC has resolved the problem that the DC-IN LED repeats turning-on and turning-off due to the variation of the power-supply voltage in the case of noncontact power-feeding.

That is, even when the system power is within the rated electric-power, if the electric-current variation of the non-contact power-feeding module exceeds the threshold (i.e., the electric-current variation is at a level that cannot be dealt with by the noncontact power-feeding module), the stable supply of electric-power to the system is implemented utilizing electric-discharge caused by performing a boost operation using the battery as a power supply. Moreover, providing a blank time in the controlling of the DC-IN LED by the EC resolves the problem that the DC-IN LED repeats turning-on and turning-off due to the variation of the power-supply voltage in the case of noncontact power-feeding.

In the future, it is predicted that a power-supply unit, such as a noncontact power-feeding type one, which is inferior to the conventional AC adapters in load response characteristic will be brought into a market. A system design in consideration of a power-supply unit having a poor load response will be needed on a system side in the future. At that time, if designing is performed to suppress system load variation, the problem of the degradation of system performance or the problem of power increase will arise. The presently proposed patent can prevent the problems of the system performance degradation and the power increase, and achieve stable power-feeding. Moreover, it is requested that the problem of the repetition of the turning-on and turning-off of the DC-IN LED due to the variation of the power-supply voltage in the noncontact power-feeding can be resolved by providing a blank time in the controlling of the DC-IN LED by the EC.

Even when the system power is within the rated electric-power of the noncontact power-feeding module, if the electric-current variation of the noncontact power-feeding module exceeds the threshold (i.e., the electric-current variation is at a level that cannot be dealt with by the noncontact power-feeding module), the stable supply of electric-power to the system can be achieved utilizing electric-discharge caused by performing a boost operation using the battery as a power supply.

To resolve this problem, according to this embodiment, it has been devised that even when the system power is within the rated electric-power of the noncontact power-feeding module, if the electric-current variation of the noncontact power-feeding module exceeds the threshold (i.e., the electric-current variation is at a level that cannot be dealt with by the noncontact power-feeding module), the stable supply of electric-power to the system is implemented utilizing electric-discharge caused by performing a boost operation using the battery as a power supply.

According to this embodiment, boosting is performed by detecting the electric-current variation of the system. Thus, the stable supply of electric-power can be implemented without occurrence of variation of the power-supply voltage of the system. This embodiment also can deal with the load variation within the rated electric-power of the noncontact power-feeding module. Even when a power supply such as the noncontact power-feeding module, which is sensitive to the load variation, stable electric-power can be supplied to the system by detecting the variation of the load current of the system and performing an operation of boosting from the battery.

Even when the system power is within the rated electric-power of the noncontact power-feeding module, if the electric-current variation of the noncontact power-feeding module exceeds the threshold (i.e., the electric-current variation is at a level that cannot be dealt with by the noncontact power-feeding module), the stable supply of electric-power to the system is impelemented utilizing electric-discharge caused by performing a boost operation using the battery as a power supply.

Incidentally, the invention is not limited to the above embodiments themselves. In an implementing stage, the invention may be embodied while variously modifying components without departing from the spirit and scope of the invention.

Moreover, various embodiments of the invention can be implemented by appropriately combining plural components disclosed in the above embodiment. For example, some components may be deleted from all components described in the above embodiment. Furthermore, the components in different embodiments may appropriately be combined with one another.

The invention claimed is:

1. A feeding apparatus configured to be supplied with electric-power from a noncontact power-feeding module and to feed electric-power to a power-feeding object, the feeding apparatus, comprising:
   an electric-current variation detecting block configured to detect variation of power-feeding electric-current supplied from this noncontact power-feeding module;
   a battery configured to assist supply of electric-power from the noncontact power-feeding module; and
   a charger configured to perform setting for boosting, based on a request from the electric-current variation detecting block, wherein the battery assists supply of electric-power when the setting for boosting is performed.

2. The feeding apparatus according to claim 1, wherein the request is made if the variation of power-feeding electric-current exceeds a predetermined threshold.

3. The feeding apparatus according to claim 1, wherein the charger comprises a DC/DC converter.

4. The feeding apparatus according to claim 1, further comprising:
   a power-feeding determination means configured to make determination on whether power-feeding is performed by the noncontact power-feeding module, and to notify the electric-current variation detecting block of a result of the determination, wherein the electric-current variation detecting block suppress the request if the result of the determination is negative.

5. The feeding apparatus according to claim 4, wherein if the result of the determination represents that power-feeding is performed, the power-feeding determination means indicates that power-feeding is performed.

6. A feeding method for supplying electric-power to a power-feeding object in a feeding apparatus supplied with electric-power from the noncontact power-feeding module, the feeding method comprising:
   detecting variation of power-feeding electric-current supplied from this noncontact power-feeding module;
   performing setting for boosting, based on a result of detecting the variation of power-feeding electric-current; and
   assisting power-feeding from a battery, based on the setting for boosting.

* * * * *